US009562783B2

(12) United States Patent
Bourne

(10) Patent No.: US 9,562,783 B2
(45) Date of Patent: Feb. 7, 2017

(54) IDENTIFYING FUTURE LOCATION AND PROVIDING PATH CROSSING INDICATIONS

(71) Applicant: Proxpro, Inc., Weston, MA (US)

(72) Inventor: Julian J. Bourne, Weston, MA (US)

(73) Assignee: Proxpro, Inc., Weston, MA (US)

( * ) Notice: Subject to any disclaimer, the term of this patent is extended or adjusted under 35 U.S.C. 154(b) by 0 days.

(21) Appl. No.: 13/632,542

(22) Filed: Oct. 1, 2012

(65) Prior Publication Data

US 2013/0231858 A1  Sep. 5, 2013

Related U.S. Application Data

(60) Provisional application No. 61/542,165, filed on Oct. 1, 2011.

(51) Int. Cl.

| *G01C 21/34* | (2006.01) |
|---|---|
| *H04W 4/02* | (2009.01) |
| *H04W 4/20* | (2009.01) |
| *G06Q 10/10* | (2012.01) |
| *G06Q 50/00* | (2012.01) |
| *H04M 1/725* | (2006.01) |
| *H04L 29/08* | (2006.01) |

(52) U.S. Cl.
CPC ......... *G01C 21/3407* (2013.01); *G06Q 10/109* (2013.01); *G06Q 50/01* (2013.01); *H04W 4/023* (2013.01); *H04W 4/028* (2013.01); *H04W 4/206* (2013.01); *H04L 67/306* (2013.01); *H04M 1/72572* (2013.01)

(58) Field of Classification Search
CPC ........ G06Q 30/02; G06Q 10/10; G06Q 10/02; G06Q 10/109; G06Q 30/0254; G06Q 30/08; H04W 4/025; H04W 4/023; H04W 4/028; H04W 4/12; H04W 4/206
USPC ....... 701/424, 117, 408, 426, 439, 519, 532; 455/456.3, 414.1, 456.1, 404.2, 414.2, 415
See application file for complete search history.

(56) References Cited

U.S. PATENT DOCUMENTS

| 7,310,676 | B2 * | 12/2007 | Bourne | 709/227 |
|---|---|---|---|---|
| 7,424,541 | B2 * | 9/2008 | Bourne | 709/227 |
| 8,385,964 | B2 * | 2/2013 | Haney | 455/519 |
| 8,712,441 | B2 * | 4/2014 | Haney | 455/456.3 |
| 2001/0046657 | A1 * | 11/2001 | Dorn | 434/118 |
| 2005/0272413 | A1 * | 12/2005 | Bourne | 455/415 |
| 2006/0022048 | A1 * | 2/2006 | Johnson | 235/462.1 |
| 2006/0238409 | A1 * | 10/2006 | Yoshioka et al. | 342/126 |

(Continued)

*Primary Examiner* — Truc M Do
(74) *Attorney, Agent, or Firm* — David H. Judson

(57) ABSTRACT

A user of a mobile device may use the technique to obtain future location-based situation awareness, e.g., a future location route displayed on the user's mobile device. That future location route comprises the user's future locations through time and space, e.g., a set of planned meetings at successive locations in a geographic area. A service that provides the user's mobile device with the future location route may also alert the user of potential threats to the user's planned activities, such as a restaurant being over-booked. On a permission basis, the user's mobile device may also receive a future location route for at least one other person associated with the user in a social network. The other person's future location route may be overlaid on the user's route so that one or both individuals receive advance notifications of their potential to have their respective paths "crossing" during a future time period.

9 Claims, 6 Drawing Sheets

(56) References Cited

U.S. PATENT DOCUMENTS

| | | |
|---|---|---|
| 2008/0072139 A1* | 3/2008 | Salinas et al. ............... 715/238 |
| 2008/0195428 A1* | 8/2008 | O'Sullivan ...................... 705/6 |
| 2009/0005018 A1* | 1/2009 | Forstall et al. ............ 455/414.1 |
| 2009/0005040 A1* | 1/2009 | Bourne ...................... 455/435.1 |
| 2009/0031006 A1* | 1/2009 | Johnson ........................ 709/218 |
| 2009/0192702 A1* | 7/2009 | Bourne ......................... 701/200 |
| 2010/0082179 A1* | 4/2010 | Kronenberg ........... B62D 12/02 701/1 |
| 2010/0082247 A1* | 4/2010 | Klein et al. ................... 701/209 |
| 2010/0217663 A1* | 8/2010 | Ramer et al. ............. 705/14.42 |
| 2011/0130958 A1* | 6/2011 | Stahl et al. ................... 701/201 |
| 2011/0246404 A1* | 10/2011 | Lehmann et al. .............. 706/21 |
| 2011/0275388 A1* | 11/2011 | Haney ........................ 455/456.3 |
| 2012/0290652 A1* | 11/2012 | Boskovic ..................... 709/204 |
| 2013/0226453 A1* | 8/2013 | Trussel et al. ................ 701/533 |

\* cited by examiner

FIG. 3

Future Location Proximity Engine Settings

Include the following Groups:
- ☐ Family
- ☑ Close Friends
- ☑ Friends
- ☐ Business Contacts Alert me within the following distance:

| 100ft | 250ft | 500ft | 1000ft | 1mile |

Alert me within the following time interval

| Exact | 15 min | 30 min | 1 hour |

IDENTIFYING FUTURE LOCATION AND PROVIDING PATH CROSSING INDICATIONS

This application is based on and claims priority to Ser. No. 61/542,165, filed Oct. 1, 2011.

BACKGROUND

Location-based services for mobile phones focus on current location. These services are popular, and they include navigation, traffic, weather, coupons, travel check-in, restaurant reviews, photo sharing, local discovery (convenience store), nearest ATM, show-times, gaming, enhanced 911, people locators, and social networking. If a person's planned, routine and extemporaneous (errands) future locations can be determined, new location-based services may be optimized and personalized to solve important problems.

People enjoy maintaining status updates on social networking services like Twitter and Facebook that tell their contacts what they are doing, reading or what they are thinking about. Some status updates are tagged with latitude/longitude coordinates providing geographic position. Some social networking sites have embedded calendars that enable people to share social event details (parties, public functions, etc.) with their friends.

People use location-specific status reports to enable meeting friends or like-minded people. People can use status updates to say where they will be in the future. People can use such services to coordinate travel plans with the hope of being at the same place at the same time.

Future location, however, is very sensitive information. In some circumstances people want to privately share that location information with select people (for instance that they plan to go to the movies which is shared with close friends). In some circumstances they want to broadcast future location to as large a following as possible (a celebrity publicizing a book signing tour). Sharing future location with friends and colleagues makes it easier to meet up as friends can adjust their plans to make meeting up possible. Precisely calculating future location can also make it easier to receive relevant recommendations, coupons and other benefits allowing users to make best use of their precious time. To date, location-based applications and services have not provided solutions that adequately address future location.

BRIEF SUMMARY

The subject matter herein is a technique for predicting or estimating the location of people in the future ("future location").

A user of a mobile device may use the technique to obtain future location-based situation awareness, e.g., a future location route that is displayed on the user's mobile device. That future location route comprises the user's future locations through time and space, e.g., a set of planned meetings at successive locations in a given geographic area such as a set of city blocks. A service that provides the user's mobile device with the future location route may also alert the user of potential threats to the user's planned activities, such as a restaurant being over-booked. On a permission basis, the user's mobile device may also receive a future location route for at least one other person associated with the user in a social network (e.g., a Facebook® friend). The other person's future location route may be overlaid on the user's route so that one or both individuals receive advance notifications of their potential to have their respective paths being "crossed" during a future time period.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates a representative interface by which a user may identify one or more preferences to select persons or groups of persons whose presence at given distances and/or times are to be brought to the user's attention;

DETAILED DESCRIPTION

According to the subject matter herein, the future location platform is facilitated, preferably through a service provider. This is not a limitation, as the techniques may be implemented as a standalone product or service.

The service provider may be the same entity that provides the end user service, or any other entity. In a representative embodiment, the service provider operates a web site that is Internet-accessible through a web browser on the mobile device (or other machine such as the end user's PC).

Figure 1:
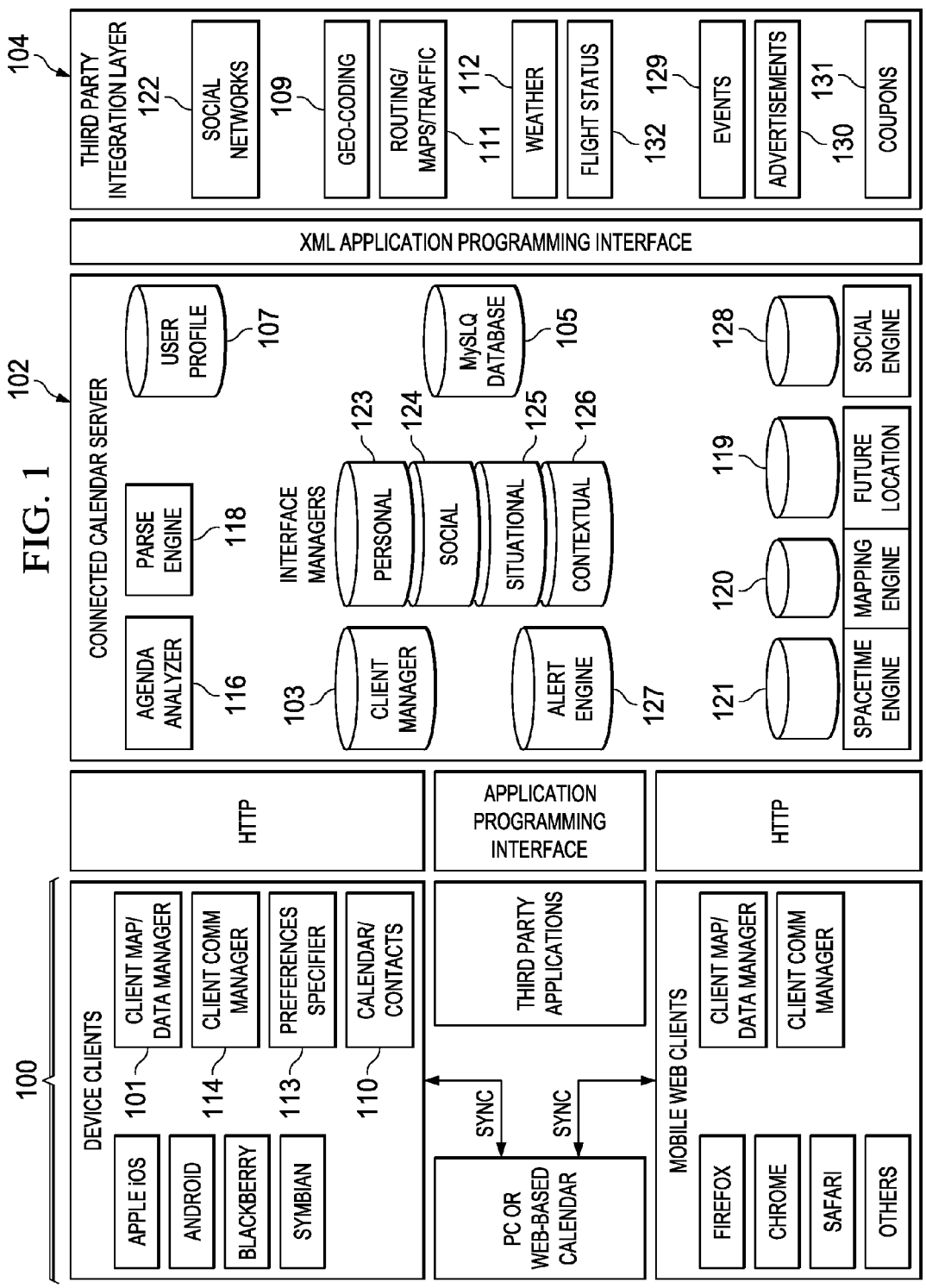
FIG. 1 is an exemplary system of computing entities in which the future location-based methods of the disclosure may be implemented.

In a representative embodiment, shown in FIG. 1, a "system" that implements the subject matter of this disclosure includes a mobile device client 100, a server 102, and a third party integration layer 104. The integration layer 104 may comprise part of the server 102 if the service provider has access to the location and traffic data (as will be described below). The mobile device client preferably is downloaded to and installed in the mobile device in any convenient manner. In one embodiment, the end user opens his or her device browser to the service provider web site and selects a link to download and install the client. Alternatively, the client may be provided as original equipment on the mobile device or otherwise pushed to and installed in the device in any convenient manner. The end user may obtain the client by responding to an SMS or other invitation.

As shown in FIG. 1, the client, server and integration layers each comprise a number of functional components. This representation is meant to be for convenience of illustration and description, and it should not be taken to limit the scope of the invention as one or more of the functions may be combined. Typically, these components are implemented in software (as a set of processor-executable computer instructions, associated data structures, and the like). One or more of the functions may be combined or otherwise implemented in any convenient manner (e.g., in hardware, in firmware, in combined hardware and software, or the like). The mobile device typically includes a microbrowser or other graphics rendering engine for displaying information to the end user in the usual manner. The device is Internet-accessible and interacts with the server 102 using known Internet protocols such as HTTP, HTTPS, and the like. The server 102 is shown as a single device but this is not a requirement either; one or more machines, programs, processes, or other code may comprise the server and be executed on one or more machines (in one or more networked locations).

A representative mobile device is a smartphone or tablet, such as the iPhone® (or iPad®) or an Android™-based phone, but this is not a limitation. Such devices typically comprise a CPU (central processing unit), such as any Intel- or AMD-based chip, computer memory, such as RAM, and a drive. The device software includes an operating system (e.g., Apple iOS, Android, or the like), and generic support applications and utilities. The device may also include a graphics processing unit (GPU). Such a mobile device also includes a touch-sensing device or interface configured to receive input from a user's touch and to send this information to the processor.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, a representative infrastructure in which the method may be practiced is a service. Without meant to be limiting, a representative technology platform that implements the service comprises machines, systems, sub-systems, applications, databases, interfaces and other computing and telecommunications resources. In one particular embodiment, a service provider comprises an Internet Protocol (IP) switch, a set of one or more web server machines, a set of one more application server machines, a database management system, and a set of one or more administrative server machines. A representative web server machine comprises commodity hardware (e.g., Intel-based), an operating system such as Linux, and a web server such as Apache 2.x. A representative application server machine comprises commodity hardware, Linux, and an application server such as WebLogic 9.2 (or later). The database management system may be implemented as an Oracle (or equivalent) database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming requests, and they export a management interface. The application servers manage the basic functions of the service including, without limitation, business logic. As will be described, the application servers may also implement the automated techniques of this disclosure.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The operation of the system is best described by the following example. As seen in FIG. 1, the client 100 and the server 102 include various functional components and associated data stores to facilitate the operation. The operation of the disclosed method may be carried out using system components other than as shown in FIG. 1.

In this example architecture, the client 100 includes a future location client Comm Manager 114, and the server includes its own connected calendar client manager 103. These data stores are used to facilitate the creation and display of a future location platform. The server 102 also includes a database (e.g. MySQL) 105 for storing location information, as well as a user profile database 107 for storing user preference data. The integration layer provides one or more application programming interfaces (APIs), such as a geo-coding API 109 for providing the server with information about the destination location, as well as a mapping and traffic API 111 for providing the server with map data and real-time (or historic) traffic data. The geo-coding API provides destination location coordinates, preferably by reverse geo-coding addresses in the end user's PIM. The mobile device actual location is provided using GPS, A-GPS, or some other data service, which obtains the device location is a known manner. Data is provided (via API 111) from a data service provider or obtained by the application natively. Of course, any convenient data services may be used or otherwise integrated into the connected calendar offering.

A user of the mobile device enters an appointment event in his or his PC- or web-based calendar 108. Typically, the event data includes fields for date, time, activity, and location. Preferably, the location is a street address. The event data may include groups with whom the event may be shared and may be categorized as work, sport, entertainment or other category set in preferences. Instead of manual entry, a service provider or other source may be used to obtain a destination location address upon receiving some request for such information. For instance, a social network (e.g., Facebook) may provide an event from which the future location and time maybe determined—a link to a website with an address and time for instance. Future location may be determined from an airport code or a flight code with departure and arrival times, or in a similar manner.

The PC- or web-based calendar 108 at some point is synchronized to a mobile PIM native calendar 110. Of course, the appointment event data may be entered into the PIM native calendar 110 directly. A Client Comm Manager 114 reads the mobile device calendar 110 over a connection, such as an industry standard JSR 75 link. The appointment event data is assimilated by a Client Comm Manager 114, which transfers the data to the server 102, preferably via HTTP. This data is received at the server 102 and processed by an agenda analyzer component 116. The agenda analyzer 116 provides the processed data to a parse engine 118, which is also connected to the third party integration layer 104, preferably via XML. The geo-coding API 109 takes unstructured address information, assesses its quality, adds one or more geo-codes, and structures that data into XML. The structured and geo-code data is stored in the database 105.

Meanwhile, a set of user preferences (such as locations of home, work, daily commute times of arrival), security data, and current location (typically, the mobile device last-known location) data are uploaded to the server, such as by a preferences specification component 113 operating in the client 100. This preference data is stored in the user profile database 107. The user's profile database 107 also organizes the user's social graph, according to the user's preferences. According to the user's relationship with people in their social graph, the user chooses people whose plans they wish to subscribe to; and organize people who follow the user's plans into groups. Third party social networking APIs 122 may be utilized to facilitate the organization of the social graph.

The FutureLocation Engine 119 determines the Future-Location path, preferably as follows. It combines planned locations uploaded from the client calendar 110 with routine locations determined from addresses entered into the preferences, and the times associated with those entries and extemporaneous locations broadcasted through social networks determines the chronological order of future locations through which the user will travel. For instance if an appointment is prior to the normal arrival time at work, the FutureLocation engine assumes the user will have travelled from home to that first appointment. If the last appointment is after work but closer to the work address, then the home address the logic determines the user will depart from the work address to the last appointment. Of course, these are just representative examples. The FutureLocation Engine logic calculates a user's future locations through time and space and records these as a series of points (e.g., time, latitude and longitude or t, x, y, z points). Using these future location points, the mapping engine determines the route to be travelled between each successive location. By subtracting the predicted duration of the trip from the planned arrival times, the user's departure time is calculated. This data is passed to the SpaceTime Engine 121. The SpaceTime engine 121 represents the user's path through time and space recording data points at 15 minute intervals (or some other time interval) between departure time and arrival time. The Spacetime Engine uses logic to determine if the user remains at the location, for instance, arriving home with no planned appointments that evening (in this example, the spacetime coordinate remains unchanged while the user is at home). The Spacetime path is passed back to the database 105 and stored. It is possible to use linear lines between future locations, and not the detailed routes following roads, to make the calculations simpler.

Preferably, each event is private or is identified by a social group tag. If a user's event is tagged with a group the social engine 128 determines the group and the constituent members of the group, or friends. A record of the event is placed in the database 105 for each friend, and these items make up a friend plan, which includes opportunities to socially interact without necessarily being a commitment. These events can also be organized as lists under activity categories as mentioned above.

Figure 2:
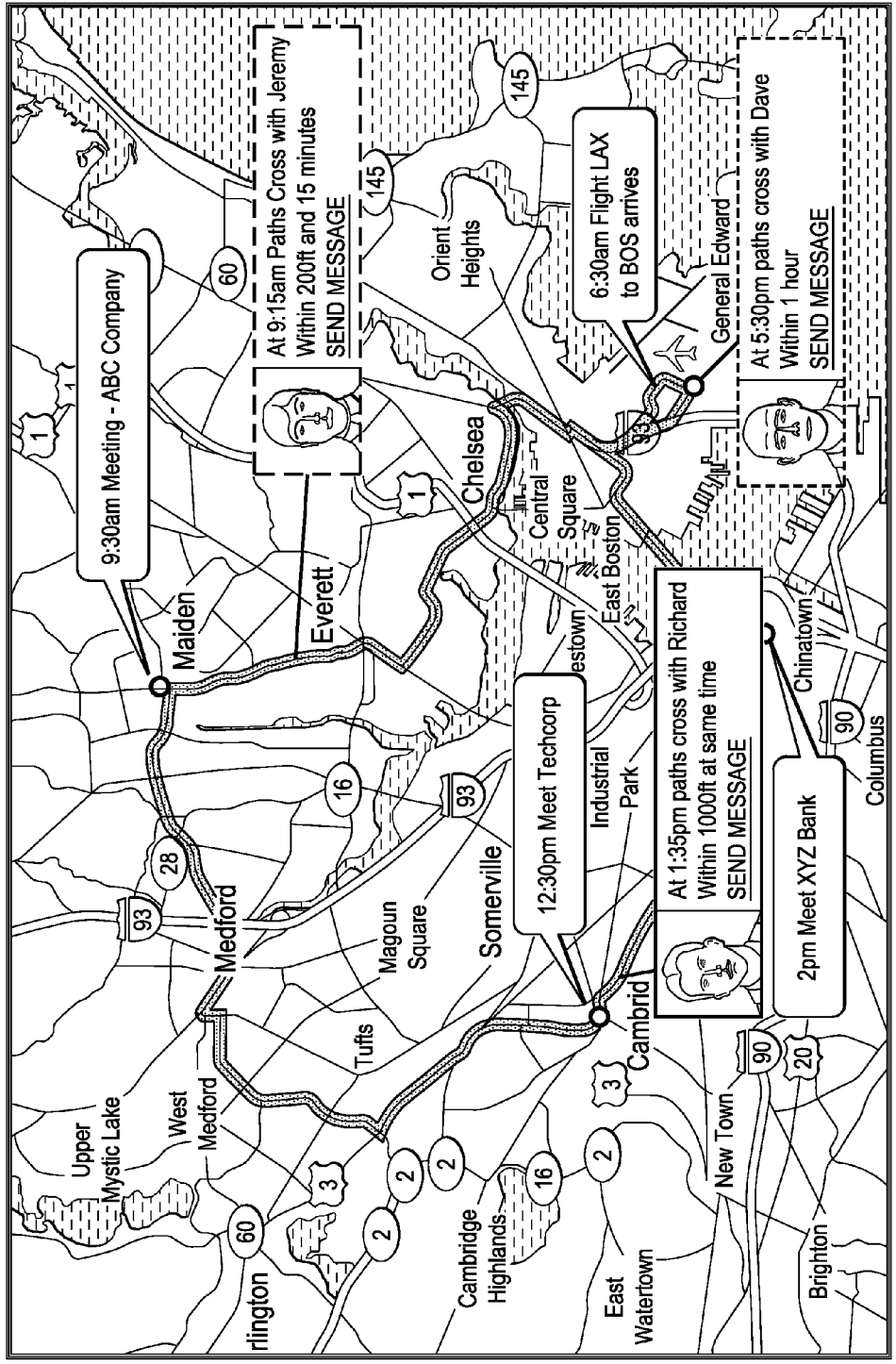
FIG. 2 illustrates a representative future location route map generated by the system.

The Path Crossing Engine assimilates the future location paths for a user and compares the future location paths to that of their friends, social graph or wider groups of like minded people. By day, hour or minute increments the distance, or proximity, between the future locations of friends is measured. Paths may physically cross or may come close to crossing the tangent of the other user's path. Timing may mean that paths are crossed but temporally not synchronized. The Path Crossing engine provides opportunities for meeting or introductions based on the most convenient time, place or gap in their mutual schedules. For instance, FIG. 2 shows the user arrives at Logan airport on the "red eye" flight at 6:30 am. The user has 3 meetings that day (in Malden, in Cambridge, and in downtown Boston). These meetings may be shared or private. The Path Crossing engine indexes the future location table and compares all locations for people in the user's social graph.

Thresholds may be set for relationship, distance and timing, e.g. using a user interface such as shown in FIG. 3, which is representative. For instance, using an input menu, the user may select whether the contact is a close friend, an acquaintance or a business contact, and/or whether such person is going to be within certain select distances (e.g., 250 ft, 500 ft, 1000 ft) or times (within 15 minutes, 30 minutes or 1 hour, etc.) as the user continues through his or her day.

In the FIG. 2 example, and on the first leg of the trip, from Logan airport to Malden, the user's path is crossed by Jeremy, who the user has identified as a close friend. The proximity is within 200 ft and 15 minutes. The service provides the user with an indication of the potential crossing. The user has the opportunity to send a message and arrange to meet in person. Alternatively, the algorithm may calculate the time when the shortest distance separates the friends. The algorithm may also calculate the time a given number (e.g., three (3) or more friends) are in the closest physical or temporal proximity. The Path Crossing engine may also provide appropriate notifications if users change their plans or run late.

As an alternative, the Path Crossing engine may access the user's address book or online directory and indicate when a user may be nearby a customer office or a client's home.

As an alternative, the Path Crossing engine may access location information, from third party APIs, indicating an individual habitually visits a location, like a coffee shop, or the like, and then present a probability that the friend may be at some particular intersection.

The interface managers manage personal 123, social 124, situational 125, and contextual 126 data relevant to events and future locations.

The personal interface manager 123 indexes the database for personal calendar events. Other relevant information may be assimilated, for instance time and location-based weather, other friends that have joined the event or trip time or distance information added from the mapping engine 120.

The social interface manager 124 indexes the database for friend's events, i.e., events that have been shared but are not subscribed. Other relevant information is included in the fields including, for example, who created the event, who is subscribed to the event, weather and trip information, and so forth. The social interface manager may organize social events into event categories as mentioned above. The distance to a friend's event may be used to determine the importance of the opportunity and its display may be adjusted through the user preferences. The social interface manager 124 may also present path crossing opportunities determined by the Path Crossing engine. As previously explained, there may be preferences set to determine the distance or time threshold under which a friend triggers a path crossing opportunity or the number of such events.

The situational interface manager 125 draws from the database 105 the future locations and the time-space path coordinates. An interaction with the mapping engine overlays maps, routes, predicted traffic and predicted weather along the time space calendar path. Under circumstances when the user's time space path intersects with severe weather (or other similar type of information), the alert engine 127 is programmed to push a notification to the user's device. For example, assume that the calendar event indicates a flight on the following Thursday and thunderstorms are predicted; in such case a notification may be provided. Such information may be received from a third party flight status API 132, which indicates a flight status is changed from on time to delayed.

The contextual interface manager 126 draws from the database 105 the future locations and the time-space path coordinates. An interaction with the mapping engine 120 overlays maps and routes accesses third party APIs for relevant entertainment events 129, advertisements 130 and coupons 131. Relevance is driven by time, location and subject line of event or set by a user's preferences.

While the above describes personal, situational, contextual and social interfaces as separate, it should be understood such operations may be mixed or layered according to the preferences of the user.

The server communicates to the client via a client manager, and in some circumstances mentioned above via the alert engine 127. The client map/data manager 101 presents data on the display according to the design of the graphic user interface.

Figure 4:
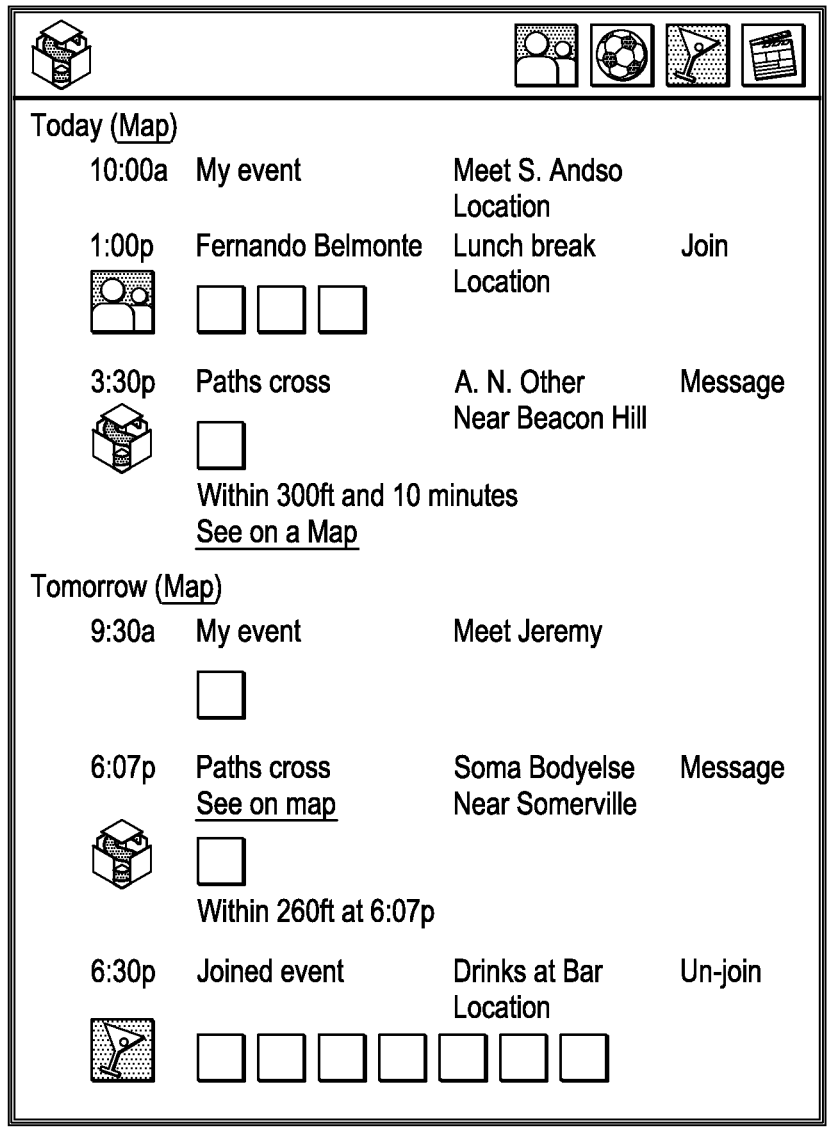
FIG. 4 illustrates a representative output of the system describing a user's future location route and potential overlaps with other individuals that are associated with the user.

FIG. 4 illustrates a display "crossing paths" tab that may be displayed on the user's device when the user logs into the service. This tab provides an agenda display format. In particular, a tab displays, preferably in chronological order, all the event on the user's timeline (e.g., his or her events, friend's events, crossing path opportunities, and the like). Color-coding may be used to highlight differences.

Figure 5:
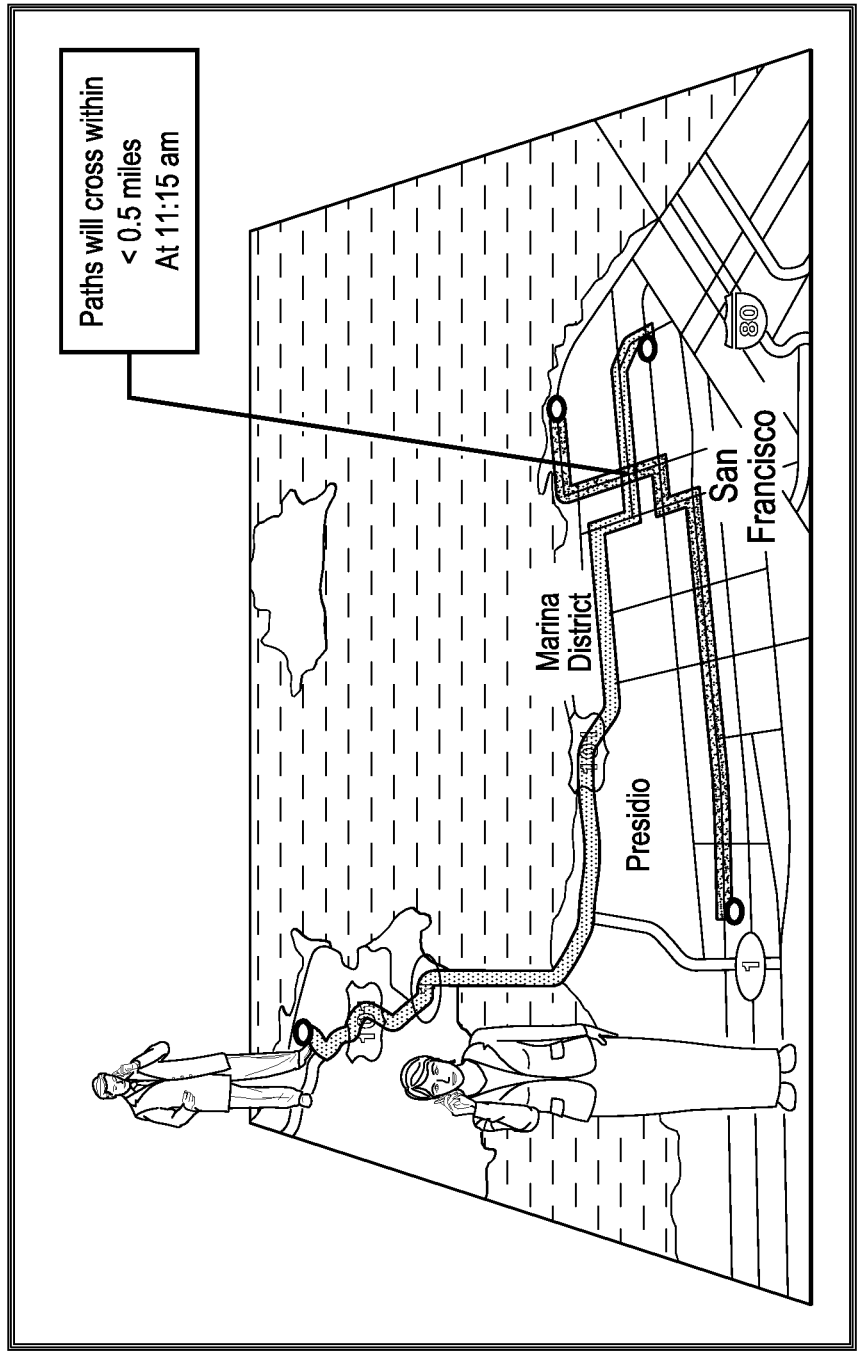
FIG. 5 illustrates how future location routes may be overlaid upon one another to facilitate the notifications to one or both of the users.

FIG. 5 is another example of a path crossing display that may be made to one or both of the individuals whose paths are anticipated to intersect (based on the information received and processed by the location platform).

Figure 6:
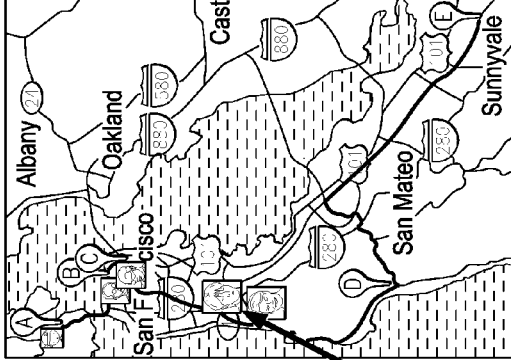
FIG. 6 illustrates a further example of a mobile device application and its associated interfaces.

FIG. 6 illustrates a further example showing three (3) display screens that are available in a mobile device application that implements the client-side of the future location functionality. The left portion illustrates preferences for path crossings. The check boxes indicate which groups of friends that a user wishes to be alerted (of path crossing opportunities). The drop box indicates the distance (e.g., in miles) within which a friend must travel to trigger an alert or other notification. The middle portion of the figure illustrates the user's schedule in an agenda format. In this agenda format, events are shared with friends and profile pictures (of the friends) subscribing to the event are shown below the subject line. Each event shows subject, time and date, time and location-based weather, the friends subscribed to the event, and so forth. The display on the right portion of the drawing shows the actual locations of each event for day, e.g., as map pins. The display also shows the route that connects the dots, as well as the friends whom the path crossing engine has determined will cross the route (when and where).

Of course, the above example screen layouts are merely representative and should not be taken to limit the subject matter of this disclosure, as any particular output format for the mobile device may be used. Thus, for example, an audible or aural indication may be provided for an event, a path crossing opportunity, or the like.

Path crossing settings can be changed in the user's "profile." As has been described, preferably the service functions separately to events. A path crossing opportunity may occur when the user is between two private events. The user may choose "groups" to be included in the settings, or he or she may switch off the function. Groups are a way to share some plans with some friends, other plans with other friends or keep plans totally private. So, if the user shares an event, like going to the movies, with his or her "close friends" group, only people in the "close friends" group will be able to see that event on their "Friends' Plans" page. The service may provide several default groups: family, close friends, friends and co-workers. The user may add more groups go into "profile">"Groups" and add a group. Then the new group becomes available and the user can select friends to add to his or her new group.

A "Followers" function may also be implemented. Followers are people who have chosen to follow a user's plans. They may be friends or they may be people the user vaguely knows or does not know at all. Preferably, the user will be notified if he or she has a new follower. Until the user assigns the new follower to a group, preferably the follower cannot see the user's plans (unless the event is a public plan). When the user assigns the follower to a group they can only see events that have been tagged to be visible to that group. If the user wishes to "Block" someone, he or she can select a "Block" tab next to their name. It is also possible to Un-Block someone later.

As noted, preferably the user can also vary the distance, physical proximity threshold when the path crossing notification will be activated.

The described technique provides a privacy-first, geo-social calendar that allows a user to see when his or her path will cross those of his or her friends without having to share specific appointments (unless desired to do so). The service presents the user's calendar (e.g., in a daily mode) and shows where friends may be nearly in the future.

In this example, the service is set to notify the user if a friend is within a one mile radius of the user's planned route. There is an entry in the user's plans agenda view that says "next Thursday at 1.46 pm, David will be within 1 mile." An icon is displayed on the map. David is not at that location now, the icon is placed roughly where David will be assuming he undertakes his own travel plans. David's precise location is obfuscated for privacy.

Preferably, events are added to the path crossing service, e.g., via Google calendar, or added directly. By default, the service assumes every event is private, and no one can see this event unless the user chooses to make the event visible. To share an event with someone, the user chooses one or more groups to share that event with, or he or she can make it visible to anyone.

The future location path may be annotated with additional information, such as locations (e.g., bars, coffee shops, restaurants, etc.) that are routinely visited so that a more detailed or fine-grained pattern of future locations may be used to facilitate the future path generation and path crossing determination.

The techniques herein provide an additional advantage of enabling prediction of a start location for future travel.

The path crossing feature of this disclosure is not limited to a user crossing his or her path with another individual; the techniques may be used to indicate to the user that his or her future path may be crossing with a particular brand, given weather, a purchase opportunity, a given geo-temporal event or occurrence, combinations thereof, or the like. Further, the path crossing engine may determine that a particular future route intersects with one or more people, events, and combinations thereof.

The platform and techniques described above provide many advantages. The platform enables predicting or estimating the location of people in the future. Information is updated asynchronously by permitted entities, preferably on an opt-in basis, or from publicly-available sources. Because the user has identified a future activity, a time and a place, and because the service preferably utilizes "push" technology, the service may alert users of potential threats to their plan and urge them to take action immediately. For instance, a restaurant or theatre may be close to capacity and require action or alternative plans. In this way, and has been described, the future location platform provides a powerful call to action and the gateway to many varied commercial opportunities.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The invention claimed is:

1. An article comprising a non-transitory machine-readable storage medium that stores a program, the program adapted to be executed by a machine to provide future location-based situation awareness to a user of a mobile device, the mobile device storing the user's calendar and contact information, the program comprising:
   program code to receive calendar data;
   program code to receive contemporaneous location data;
   program code to use the received calendar and contemporaneous location data to calculate, as a series of points, the user's future locations through time and space;
   program code to use the series of points to determine a future location route to be traveled by the user;
   program code to generate data that represents the user's future location path between a departure time and an anticipated arrival time as reflected in the calendar data, the departure time being computed at least in part by subtracting a predicted duration of a trip along the future location route from the anticipated arrival time; and
   program code to receive user preference data entered on the display interface, the preference data identifying at least one social network relationship together with a distance or time threshold for identifying a path crossing opportunity with respect to the user's future location path;
   program code to correlate the user's future location path and a future location path of at least one other user matching the social network relationship and the distance or time threshold to generate second data; and
   program code to provide the second data to the mobile device to facilitate display on the mobile device display interface of the path crossing opportunity.

2. The article as described in claim 1 wherein the points are associated with given time intervals.

3. The article as described in claim 2 wherein each time interval is 15 minutes.

4. The article as described in claim 1 wherein the program includes program code to associate a social group tag with a location along the future location path.

5. The article as described in claim 4 wherein the program includes program code to identify a group and constituent members of the group associated with the social group tag.

6. The article as described in claim 5 wherein the program includes program code to generate a future location path for at least one constituent member of the group, the at least one constituent member of the group being the at least one other user matching the social network relationship and the distance of time threshold.

7. The article as described in claim 6 wherein the program includes program code to overlay the future location path for the at least constituent member of the group on the future location path for the user.

8. The article as described in claim 1 wherein the program further includes program code operative to issue a notification with respect to an occurrence associated with the future location path.

9. The article as described in claim 1 wherein the second data is devoid of geo-location information identifying an actual location of the at least one other user to protect privacy of the at least one other user.

* * * * *